United States Patent
Aravamudan

(10) Patent No.: US 9,525,918 B2
(45) Date of Patent: Dec. 20, 2016

(54) SYSTEMS AND METHODS FOR AUTOMATICALLY SETTING UP USER PREFERENCES FOR ENABLING SUBTITLES

(71) Applicant: United Video Properties, Inc., Santa Clara, CA (US)

(72) Inventor: Murali Aravamudan, Andover, MA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/314,644

(22) Filed: Jun. 25, 2014

(65) Prior Publication Data

US 2015/0382064 A1    Dec. 31, 2015

(51) Int. Cl.
*H04N 21/475*    (2011.01)
*H04N 21/25*    (2011.01)
*H04N 21/258*    (2011.01)
*H04N 21/466*    (2011.01)
*H04N 21/485*    (2011.01)
*H04N 21/41*    (2011.01)
*H04N 21/422*    (2011.01)
*H04N 21/45*    (2011.01)
*H04N 21/6543*    (2011.01)
*H04N 21/488*    (2011.01)

(52) U.S. Cl.
CPC ........ *H04N 21/4755* (2013.01); *H04N 21/251* (2013.01); *H04N 21/25891* (2013.01); *H04N 21/4667* (2013.01); *H04N 21/4856* (2013.01); *H04N 21/4884* (2013.01); *H04N 21/4126* (2013.01); *H04N 21/42201* (2013.01); *H04N 21/4532* (2013.01); *H04N 21/6543* (2013.01)

(58) Field of Classification Search
CPC . H04N 21/4334; H04N 21/485; H04N 5/4403
See application file for complete search history.

(56) References Cited

U.S. PATENT DOCUMENTS

| | | | |
|---|---|---|---|
| 5,966,120 A * | 10/1999 | Arazi et al. | 715/724 |
| 8,380,726 B2 | 2/2013 | Aravamudan et al. | |
| 8,429,188 B2 | 4/2013 | Aravamudan et al. | |
| 8,458,758 B1 | 6/2013 | Nguyen | |
| 8,583,566 B2 | 11/2013 | Aravamudan et al. | |
| 2004/0139480 A1* | 7/2004 | Delpuch et al. | 725/135 |
| 2006/0041829 A1* | 2/2006 | White | 715/500.1 |
| 2009/0060452 A1 | 3/2009 | Chaudhri | |
| 2010/0106482 A1 | 4/2010 | Hardacker | |

(Continued)

FOREIGN PATENT DOCUMENTS

WO    WO 2009/157963    12/2009

*Primary Examiner* — Randy Flynn
(74) *Attorney, Agent, or Firm* — Ropes & Gray LLP

(57) ABSTRACT

Systems and methods for automatically enabling subtitles are provided. A user request to enable subtitles setting is received while the user is viewing a first media asset. A characteristic associated with the first media asset is retrieved. An indication of user preference for subtitles of media assets associated with the retrieved characteristic is automatically stored in response to receiving the user request. The subtitles setting is automatically enabled when the subtitles setting is disabled, based on the stored indication, when a second media asset that is associated with the retrieved characteristic is accessed.

20 Claims, 8 Drawing Sheets

(56) References Cited

U.S. PATENT DOCUMENTS

| | | |
|---|---|---|
| 2010/0146445 A1 | 6/2010 | Kraut |
| 2010/0226526 A1* | 9/2010 | Modro et al. ................ 382/100 |
| 2010/0291969 A1* | 11/2010 | Fujimoto ............ H04N 21/414 |
| | | 455/556.1 |
| 2012/0090003 A1 | 4/2012 | Dove |
| 2012/0114303 A1* | 5/2012 | Chung et al. ................ 386/244 |
| 2012/0265907 A1 | 10/2012 | Serdiuk |
| 2012/0324492 A1 | 12/2012 | Treadwell |
| 2013/0133022 A1 | 5/2013 | Bi |
| 2013/0283162 A1 | 10/2013 | Aronsson |
| 2013/0340019 A1* | 12/2013 | Shimizu ........................ 725/110 |
| 2014/0078039 A1 | 3/2014 | Woods |
| 2014/0150002 A1 | 5/2014 | Hough |
| 2014/0176580 A1* | 6/2014 | Brown et al. ................ 345/520 |
| 2014/0282711 A1* | 9/2014 | Xiong et al. .................... 725/34 |
| 2015/0014417 A1* | 1/2015 | Finlow-Bates et al. . 235/462.41 |

\* cited by examiner

600

| Characteristic | Subtitles |
|---|---|
| Action | No |
| Comedy | Yes |
| Sports | No |
| HD Quality | No |
| SD Quality | Yes |
| Less than 30 Minutes | No |
| ESPN Channel | No |
| Netflix Content Source | Yes |
| ⋮ | ⋮ |

| Activity Type | Subtitles |
|---|---|
| Running | Yes |
| Jogging | No |
| Heart Rate > 120 bpm | Yes |
| Breathing > 30 bpm | Yes |
| Supermarket | No |
| Home | Yes |
| Brainwave Information Indicates Stress | Yes |
| Brainwave Indicates Increase in Beta Waves | No |
| ⋮ | ⋮ |

FIG. 7

SYSTEMS AND METHODS FOR AUTOMATICALLY SETTING UP USER PREFERENCES FOR ENABLING SUBTITLES

BACKGROUND

In conventional systems, consumers of media who desire to view subtitles have to manually set their preferences for when closed-captioning should be enabled. However, setting up such preferences can be confusing and burdensome to the users. Accordingly, most users simply resort to manually enabling or disabling closed captioning each time they have a need to toggle the display of subtitles.

SUMMARY

Accordingly, methods and systems are disclosed herein for automatically setting up user preferences for enabling subtitles.

In some embodiments, systems and methods for automatically enabling subtitles are provided. A user request to enable a subtitles setting is received while the user is viewing a first media asset. For example, a user may press a dedicated remote control button to change the subtitles setting or through an on-screen menu selection change the subtitles setting to be enabled. A characteristic associated with the first media asset is retrieved. In some implementations, the characteristics may include at least one of a genre, a category, a length, a media asset type, a content source, and a media asset format.

An indication of user preference for subtitles of media assets associated with the retrieved characteristic is automatically stored in response to receiving the user request. In some implementations, the indication is stored in a user profile indicating that the user prefers subtitles for media assets associated with the retrieved characteristic. In some implementations, the indication is stored in a database that associates characteristics of media assets with states of the subtitles setting. The subtitles setting may be automatically enabled when the subtitles setting is disabled, based on the stored indication, when a second media asset that is associated with the retrieved characteristic is accessed. The stored indication may be shared with other users and used by devices associated with the other users to determine whether or not to enable a subtitles setting for those users when they request access to content having the corresponding characteristic.

In some implementations, after the user changes the subtitles setting, the user may request to access a third media asset. While accessing the third media asset, the user may request to change the subtitles setting to be in the disabled state. In some implementations, the media guidance application may update a profile (which may contain a database) associated with the user to indicate that for media assets having the characteristic of the third media asset, the subtitles setting state should be disabled.

When the user later requests to access the second media asset (e.g., after accessing the first media asset followed by the third media asset), the media guidance application may determine whether or not to automatically change the subtitles setting state. Specifically, the media guidance application may retrieve a characteristic of the second media asset and determine whether it matches the characteristic of the first media asset. If the characteristic of the second media asset matches the characteristic of the first and the subtitles setting is currently in the disabled state, the media guidance application may automatically enable the subtitles setting.

In some embodiments, systems and methods for automatically enabling subtitles are provided based on user activity types. A user request may be received from a user input device to access a first media asset. A type of activity associated with the user is detected in response to receiving the user request. The type of activity is cross-referenced with a database of activity types associated with subtitles stored in a storage device. A subtitles setting is automatically enabled when the subtitles setting is disabled, in response to determining that the type of activity associated with the user is associated with subtitles.

In some implementations, the type of activity may correspond to a biometric state of the user, brain activity of the user, a physical activity of the user, and/or a location. The type of activity may be determined by receiving at least one of biometric information, brainwave information, and location information from a mobile device associated with the user. The mobile device may be a wearable device. In some implementations, the type of activity may be detected based on a gesture or combination of gestures a user makes. The gesture or combination of gestures may indicate that the user is performing a physical activity (e.g., running). Based on the physical activity, the media guidance application may enable or disable the subtitles setting. In some implementations, the subtitles setting is changed back to a previous state (e.g., disabled if it was enabled) when the media guidance application detects that the activity type is no longer present (e.g., the physical activity ended).

In some embodiments, the database of activity types associated with the subtitles setting state may be generated and/or updated based on detecting activity types associated with the user when the user requests to enable/disable the subtitles setting.

In some embodiments, when the subtitles setting is enabled, the subtitles corresponding to a media asset presented on a first device are presented to the user on a second device (e.g., a second screen device). In some implementations, the subtitles are presented in an overlaying relationship with the media asset on the same user equipment device.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 6 and 7 show illustrative databases for associating a characteristic and/or activity type with a subtitles setting in accordance with some embodiments of the disclosure;

DETAILED DESCRIPTION OF DRAWINGS

Figure 1:
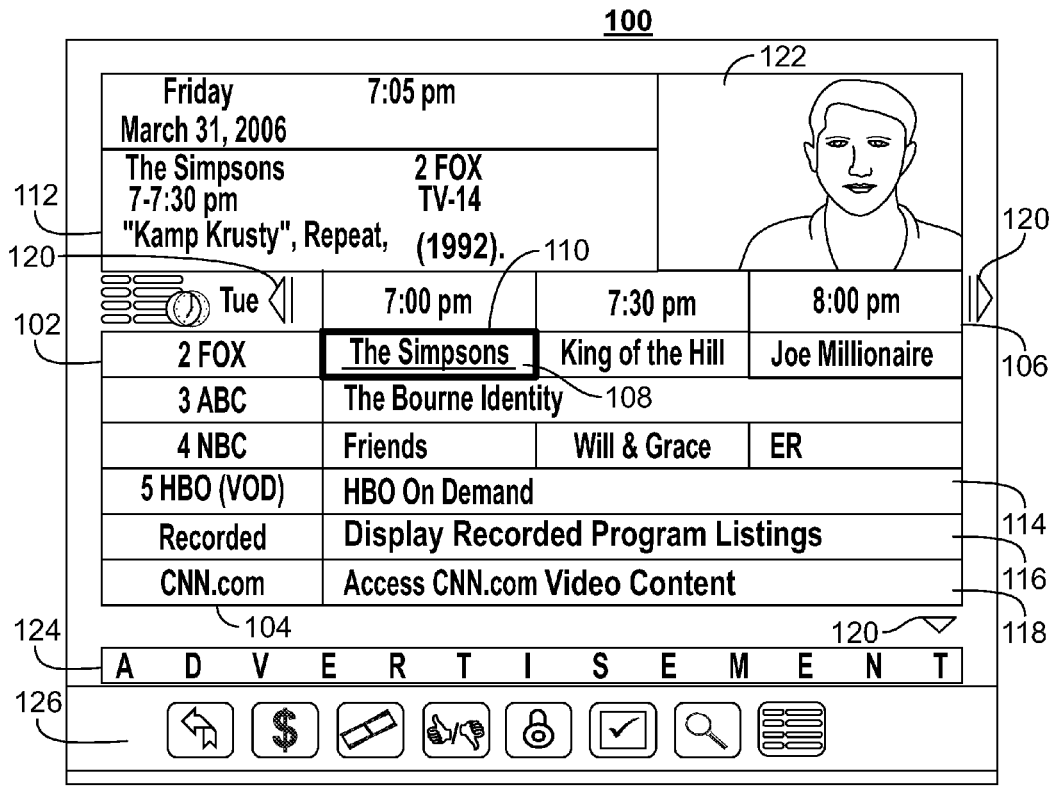
FIGS. 1 and 2 show illustrative display screens that may be used to provide media guidance application listings in accordance with an embodiment of the invention.

Methods and systems are disclosed herein for automatically setting up user preferences for enabling subtitles and/or for automatically enabling a subtitles setting based on activity types. As referred to herein, the term "subtitles" is used interchangeably with the term "closed-captioning" and should be understood to have the same meaning. As referred to herein, a "subtitles setting" is an option having an enabled state and a disabled state. When the subtitles setting is in the enabled state, subtitles, if available, are presented with a media asset. When the subtitles setting is in the disabled state, subtitles are not presented for a media asset. In some implementations, the subtitles setting is a global setting that controls subtitles for every media asset that is displayed on a user equipment. Accordingly, enabling the subtitles setting results in the presentation of subtitles for every media asset that is accessed from any content source (e.g., channel) until the subtitles setting is disabled.

With reference to media assets or content, the amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), subtitles, media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
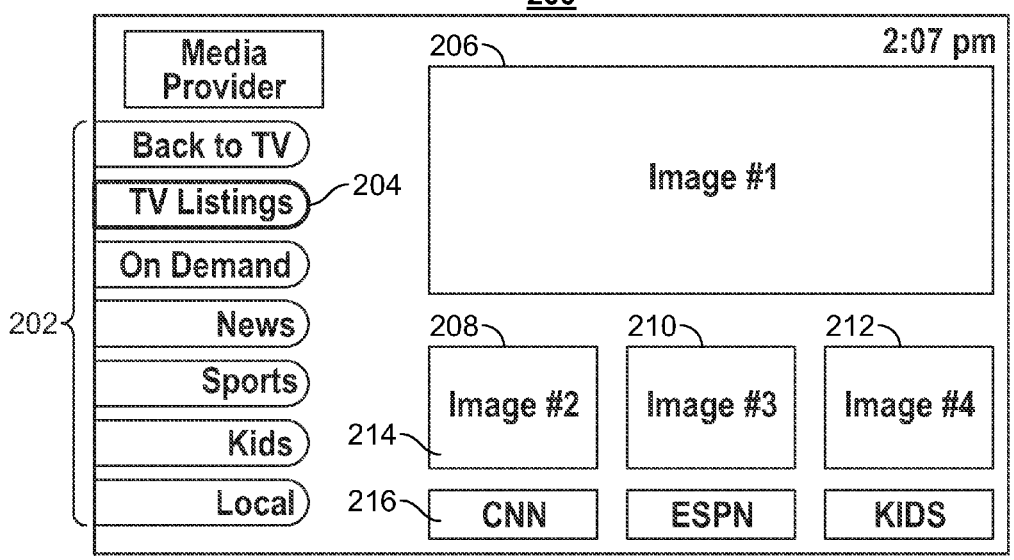
Figure 5:
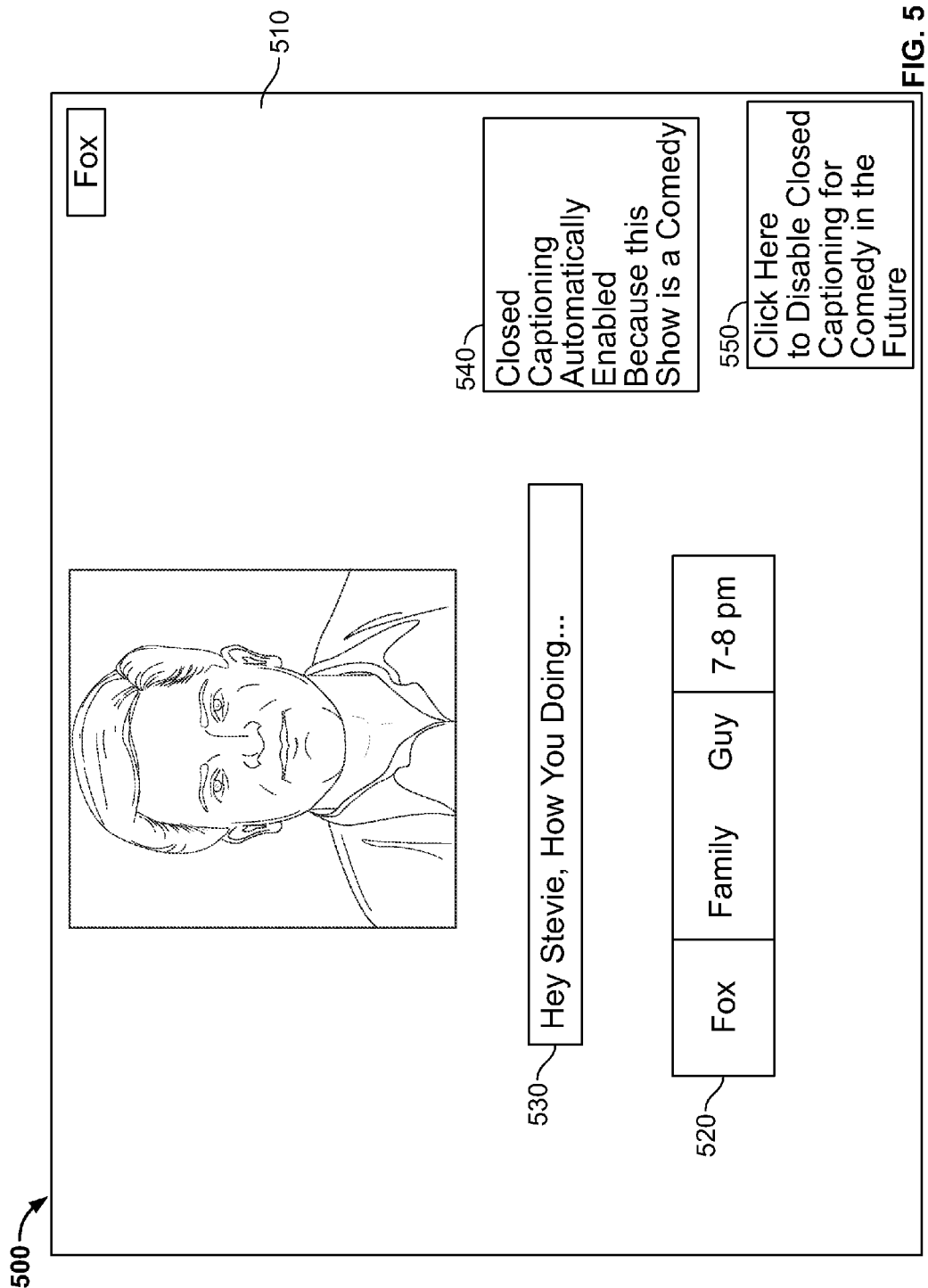
FIG. 5 shows an illustrative display screen of a media asset for which a subtitles setting has been automatically enabled in accordance with some embodiments of the disclosure.

FIGS. 1 and 2 show illustrative display screens that may be used to provide media guidance data. The display screens shown in FIGS. 1-2 and 5 may be implemented on any suitable user equipment device or platform. While the displays of FIGS. 1-2 and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, a subtitles setting, or other features. Options available from a main menu display may include search options, VOD options, parental control options, Internet options, cloud-based options, device synchronization options, second screen device options, options to access various types of media guidance data displays, options to subscribe to a premium service, options to enable/disable the subtitles setting, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

In some embodiments, user profile information may include biometric state and/or emotional state information. For example, the user profile may include associations of biometric states and emotional states with different categories of information based on user interactions with an application. For example, a media guidance application may store a profile of user interactions with action movies when the user is in an angry emotional state and with drama movies when the user is in a depressed emotional state. The media guidance application may provide recommendations based on a determined biometric state and/or emotional state of a user and the stored user profile. The media guidance application, in some embodiments, may enable/disable the subtitles setting based on the biometric state, emotional state, and/or brainwave information associated with the user. As referred to herein, the phrase "activity type" refers to information representing any combination of biometric state, emotional state, physical activity being performed by the user, location information, any activity that inhibits or impairs the user's ability to hear audio corresponding to a media asset, and/or brainwave information.

In some embodiments, the user interactions with the media guidance application may be used to develop associations between biometric states and the subtitles setting. For example, the media guidance application may detect elevated body temperature and elevated pulse rate when the subtitles setting is enabled by the user. Accordingly, the media guidance application may store in database 700 an association between elevated body temperature and elevated pulse rate and enablement of the subtitles setting. When these biometric states are detected at a future time and the subtitles setting is determined to be in a disabled state, the media guidance application may automatically enable the subtitles setting. Specifically, database 700 may include multiple entries. Each entry may include an activity type field and a corresponding subtitles setting state field. The activity type field may identify the activity type of the user and the subtitles setting field may indicate the corresponding state of the subtitles setting for that activity type.

In some embodiments, user profile information may be transmitted to a server for processing. The user profile information may also be used to calibrate cross-referencing databases used to associate biometric states with the subtitles setting. A pool of information from multiple users may be collected to determine common correlations between biometric states and the subtitles setting.

Another display arrangement for providing media guidance is shown in FIG. 2. Video mosaic display 200 includes selectable options 202 for content information organized based on content type, genre, and/or other organization criteria. Selection of option 204 may return the user to grid 102 (FIG. 1).

In display 200 listings 206, 208, 210, and 212 may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210 and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
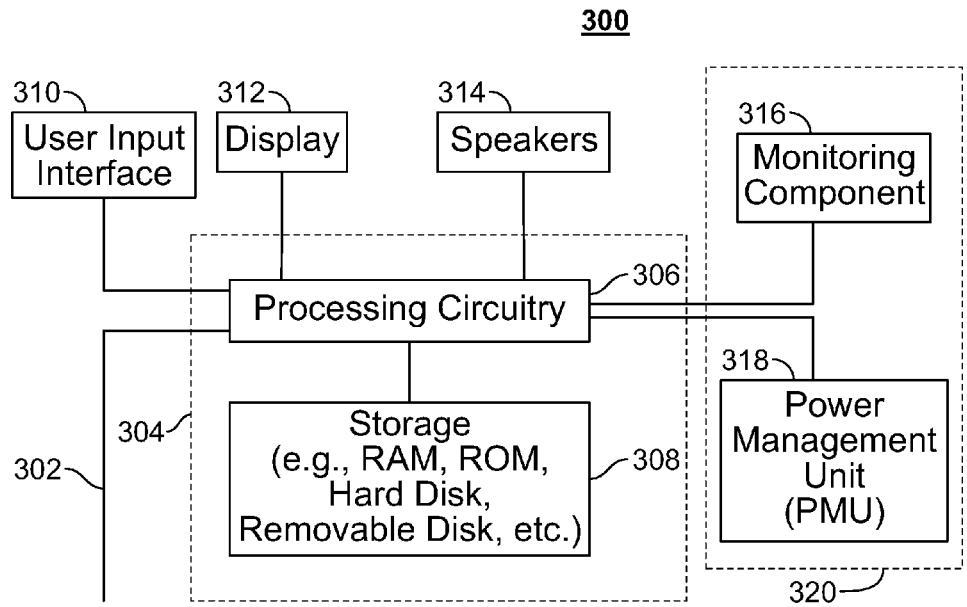
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306, detecting circuitry 320 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry may also instruct detecting circuitry 320, which can be used to detect and/or identify a user or users without requiring the user or users to make any affirmative actions by using any suitable biometric determination technique, such as facial determination, brainwave information, body temperature determination, heart rate determination, odor determination, scent determination, body shape determination, voice determination, behavioral determination, any other suitable biometric determination technique or any combination thereof.

Detecting circuitry 320 may include monitoring component 316 and power management unit 318. Monitoring component 316 may include one or more components (e.g., an EEG, EMG, pulse oximeter, etc.) for monitoring an activity type (e.g., biometric state, location, or brainwave information) of a user. As referred to herein, "location" refers to any relative or absolute identifier of a position, such as a geographical coordinate, vector for direction, street address, name of building, or any other suitable identifier. For example, a location may be indicated by coordinates in a geographic coordinate system (e.g., latitude or longitude), or a global positioning system (GPS).

It should be noted, monitoring component 316 may, in some embodiments, be located on a separate device in communication with the device upon which a media guidance application (and control circuitry 304) is implemented. For example, in some embodiments, monitoring component 316 may communicate with device 300 via a communications network (e.g., communications network 414 (FIG. 4)). In some embodiments, monitoring component 316 may be a wearable device (e.g., a wristband, headband, watch, etc.).

In some embodiments, monitoring circuitry may monitor brain activity of a user. Monitoring component 316 may transmit updates (e.g., associated with brain activity) of a user to control circuitry 304. Control circuitry 304 may compare the updates to data related to brain activity (e.g., threshold ranges, frequency ranges, etc.) of the user and/or other users stored on storage 308 (e.g., to determine whether or not the brain activity of the user corresponds to a particular threshold range and/or mood, attentiveness level, activity type, a subtitles setting, etc.).

In some embodiments, monitoring component 316 may include one or more of a temperature sensor, a pulse oximeter, a motion sensor, an accelerometer, an optical sensor, or any other suitable sensor for determining a biometric state of a user. Monitoring component 316 may include any suitable hardware and/or software to perform biometric detection and determination operations. For example, monitoring component 316 may include infrared, optical, and/or radio-frequency receivers and/or transmitters. Monitoring component 316 may additionally, or alternatively, include one or more microphones and/or cameras to detect audible and/or visual information, respectively. The microphone may be capable of receiving sounds within the audible range and/or outside the audible range. The camera may be capable of capturing information within the visual spectrum and/or outside the visual spectrum. For example, the camera may be able to capture infrared information, ultraviolet information, or any other suitable type of information.

In some embodiments, detecting circuitry 320 may additionally, or alternatively, include palm, fingerprint, and/or retinal readers for detecting and/or identifying users based on biometric information about a user. In some embodiments, detecting circuitry may communicate to processing circuitry 306 and/or storage 308 various detection and/or identification mechanisms indicating whether a user is detected and/or identified at a particular device.

As referred to herein, the term "biometric state" should be understood to mean a metric or measure indicative of a physiological state of a user, such as measurements of chemical content in body fluids (e.g., salt electrolyte concentration in perspiration, blood alcohol level, hormonal levels in blood, glucose level in blood, oxygen content of blood), measurements of circulation (e.g., pulse, heart rate), body temperature, brain activity (e.g., measured via electroencephalograms), or any other suitable measurements. As referred to herein, the term "emotional state" should be understood to mean a metric of measure indicative of a psychological state or mental state of a user, such as angry, sad, depressed, happy, agitated, bored, or any other suitable state.

For example, using an infrared camera and light source, processing circuitry 306 may generate a three-dimensional map of an area. A plurality of IR beams may each be modulated and encoded to be distinguishable, transmitted from the IR light source and directed at various points in an area. Each of the beams may reflect off objects in the room back towards the camera. Depending on the distance traveled by each light beam, the time of flight, or time traveled by each light beam may vary. If the IR camera and light source are placed side by side, travel time of the light beam may correlate to the distance of an object from the light source and camera. The time of flight may be measured as the time between transmission of the encoded beam from the light source and detection of the encoded beam at the camera. By correlating the time of flight of beams, and the initial direction of the beam, processing circuitry 306 and/or detecting circuitry 320 may generate the three-dimensional map of the area. Based on the three-dimensional map, control circuitry 304 may detect and identify distinct bodies of users, and determine distance of the body from the biometric device. Using color cameras and face detection, control circuitry 304 may detect or identify users.

Using microphones and voice recognition, control circuitry 304 may detect or identify users based on the physical characteristics of their vocal tract through voice recognition or identification. Using a sound source and an array of microphones, control circuitry 304 may determine information about the shape of the area surrounding the biometric device through acoustic localization, similar to the time-of-flight method described above in reference to IR light. For example, a sound source may be located near an array of microphones. A sound broadcast from the sound source may propagate as a wave front away from the source. As the wave front impacts an object, portions of the wave front may be reflected toward the sound source and array of microphones. Depending on the position of the object, the reflected sound may arrive at the microphone at different times. For example, the reflected sound may arrive at a closer microphone in a shorter amount of time than at a farther microphone. Based on the time or phase difference in arrival time at various microphones, total travel time of the sound, and positions of the microphones, it may be possible to generate a spatial areal map. Location of objects may be determined based on the spatial areal map generated via acoustic localization, IR time of flight, any other suitable mapping method, or any combination thereof. It should be understood that various biometric techniques and devices may be used alone, or in combination to supplement each other to more accurately identify or detect users.

In some embodiments voice recognition may be used to determine biometric and/or emotional states. For example, voice recognition may be performed on speech of a user to find words spoken during certain biometric states. Detecting circuitry 320 or control circuitry 304 may correlate spoken words and other biometric states such as heart rate and body temperature for storage in cross-referencing databases. Analysis and correlation of vocal tones may also be performed.

In some embodiments, detecting circuitry 320 may use any suitable method to determine the distance, trajectory, and/or location of a user in relation to an electronic device. The electronic device may also use, for example, triangulation and/or time-difference-of-arrival determination of appropriate information to determine a user's location in relation to an electronic device. For example, time-difference-of-arrival values of sounds emanating from a user may be determined. In some embodiments, any suitable image processing, video processing, and/or computer vision technique may be used to determine a user's distance, trajectory, and/or location in relation to an electronic device. A user's distance, trajectory, and/or location in relation to an electronic device may be determined using any suitable method.

In some embodiments, detecting circuitry 320 and/or control circuitry may conduct analysis on information from one or more monitoring components 316 to determine gestures. For example, movements of a hand, detected by an accelerometer worn on a wrist of a user may be used to determine gestures at certain points in time. The gestures may be correlated with other biometric states, brainwave information, location information, and/or emotional states to determine whether to enable/disable the subtitles setting.

In some embodiments, processing circuitry 306 may determine a location based on global positioning system (GPS) measurements, or, in the case of cellular telephones, measurements based on cell-tower signals, done by detecting circuitry 320. Processing circuitry 306 may use these measurements to determine location coordinates, which may be transmitted to other electronic devices. The processing circuitry may determine a location of the user to determine whether or not to enable/disable the subtitles setting.

In some embodiments, detecting circuitry may be used to identify a user based on a determined biometric state or biometric information about the user. An identified user may refer to a user who may be recognized sufficiently by a device to associate the user with a user profile. In some embodiments, the user may be associated with a group of users, as opposed to, or in addition to, being associated with a unique user profile. For example, the user may be associated with the user's family, friends, age group, sex, and/or any other suitable group. A detected user may refer to a user whose presence is detected by a device, but who is not yet identified by the device.

The contextual information may also include gesture information, determined based on movements of a user. For example, control circuitry 304 may determine gestures based on accelerometers in wearable devices of a user. Rapid gestures may indicate an angry emotional state, while slow regular movements may indicate a calm emotional state. Control circuitry 304 may cross-reference the gestures with a database that associates gestures with the subtitles setting to determine whether or not to enable the subtitles setting. For example, the database may maintain a history of gestures that the user performed that were followed by or preceded by the user enabling the subtitles setting. These gestures may be mapped in the database to indicate to control circuitry 304 to enable or disable the subtitles setting when the user performs the same or similar gestures in the future.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. For example, storage 308 may be used to store database 600 that associates different content characteristics with the enablement/disablement of a subtitles setting. Specifically, database 600 may include multiple entries. Each entry may include a characteristics field and a corresponding subtitles setting state field. The characteristics field may identify the characteristic of the media asset and the subtitles setting field may indicate the corresponding state of the subtitles setting for that characteristic. Similarly, storage 308 may be used to store database 600 that associates different activity types (e.g., brainwave information, location information, biometric states, physical activity, and/or gestures) with the enablement/disablement of a subtitles setting. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
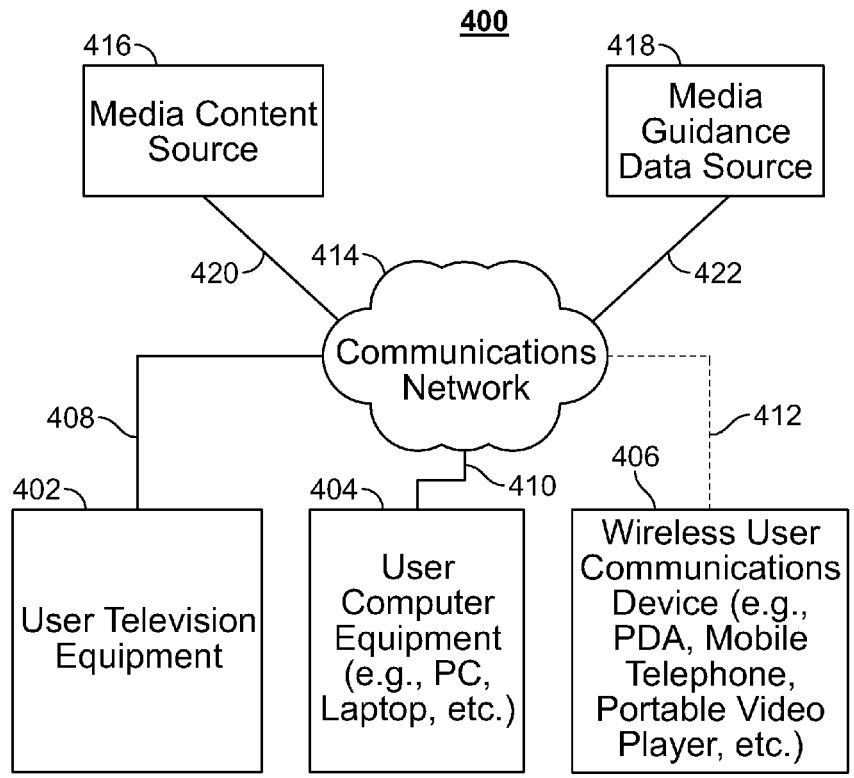
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device (e.g., the second screen device may provide subtitles, when the subtitles setting is enabled, for content presented on a first device). The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G, XLTE, and/or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, wireless user communications device 406 may include wearable devices (e.g., monitoring component 316) that are positioned on a user. For example, wireless user communications device 406 may include smart eyewear, smart watches, any other suitable user device that is wearable, or any combination thereof. The type of wearable device may affect the type of biometric state that can be determined. For example, a wearable headset device may include electrodes as part of monitoring component 316 and may be able to determine and monitor brain activity of a user. For example, a wearable ring device may include a temperature sensor to detect body temperature and may include a pulse oximeter to determine a pulse rate and a blood oxygen level.

In some embodiments, the media guidance application automatically builds a profile for a user (e.g., populates databases 600 and 700) that indicates for which content characteristics and/or activity types the user prefers to have subtitles. The media guidance application may monitor user interactions and specifically when the user enables/disables the subtitles setting to build the profile. When a media asset is being accessed having characteristics that match a characteristic in the user profile for which the subtitles setting was enabled, the media guidance application automatically enables the subtitles setting, if it was disabled.

For example, the user may request to access a given first media asset (e.g., the user may tune to a channel on which the show "Seinfeld" is provided). In response, the media guidance application may present the first media asset (e.g., "Seinfeld") to the user. While watching the first media asset, the media guidance application may receive a user request to enable the subtitles setting because the setting was previously disabled. Accordingly, the media guidance application may begin presenting subtitles for the first media asset. In response to receiving the user request to enable the subtitles setting, the media guidance application may retrieve one or more characteristics associated with the first media asset. For example, the media guidance application may retrieve any information associated with the first media asset as the characteristic (e.g., a category of the first media asset, a genre, a type, length, a quality indicator such as HD or SD, a title, a content source, a time, and/or any combination thereof). In some implementations, the media guidance application may select a combination of one or more of the multiple characteristics associated with the media asset for use as the characteristic.

In some embodiments, in response to receiving the user request to enable the subtitles setting, the media guidance application may cross-reference database 600 (FIG. 6) to determine whether the one or more selected characteristics exist in database 600 alone or as a combined entry. For example, if the media guidance application selects a genre and type as the characteristic, the media guidance application may cross-reference database 600 to determine whether an entry for the combination of genre (e.g., comedy) and type (e.g., broadcast program) exists. If an entry in database 600 exists for the selected characteristic(s), the media guidance application may determine whether the associated subtitles setting is an enabled state or a disabled state. In response to determining that the associated subtitles setting is the enabled state, the media guidance application may not update database 600. Alternatively, in response to determining that the associated subtitles setting is the disabled state, the media guidance application may update the entry in database 600 to change the associated subtitles setting to be the enabled state. If the user subsequently requests access to a media asset with the same or similar selected characteristics, the media guidance application may automatically enable the subtitles setting, if it is disabled, based on the indication in database 600.

In some embodiments, the media guidance application may only update a subtitle setting state in database 600 after receiving a threshold number of similar inconsistent requests. For example, the user may request that the subtitle setting be enabled while viewing a media asset having a given characteristic. If the characteristic is associated in database 600 with a disabled state, the media guidance application may determine for that same characteristic how many times the user previously requested that the subtitles setting be enabled. If the user previously requested that the subtitles setting for media assets having the same characteristics be enabled more than a threshold number of times (e.g., more than 5 times), and the associated subtitles setting is the disabled state, the media guidance application may update the entry in database 600 to change the associated subtitles setting to be the enabled state. If the user previously requested that the subtitles setting for media assets having the same characteristics be enabled less than a threshold number of times (e.g., less than 5 times), and the associated subtitles setting is the disabled state, the media guidance application may maintain the state of the entry in database 600 as disabled state.

In some embodiments, the media guidance application may update a subtitle setting state in database 600 to correspond to a majority of subtitles setting requests. For example, one user may request that the subtitles setting be enabled while viewing a media asset having a given characteristic whereas another user may request that the subtitles setting be disabled for a different media asset having the same given characteristic. If the characteristic is associated in database 600 with a disabled state, the media guidance application may determine a majority of previous user requests (e.g., over a given period of time (days) associated with enabling or disabling the subtitles setting. If the majority previous user requests for media assets having the same characteristics were to enable the subtitles setting, and the associated subtitles setting is the disabled state, the media guidance application may update the entry in database 600 to change the associated subtitles setting to be the enabled state. If the majority previous user requests for media assets having the same characteristics were to disable the subtitles setting, and the associated subtitles setting is the disabled state, the media guidance application may maintain the state of the entry in database 600 as disabled state.

In some embodiments, the media guidance application may include with a subtitle setting state in database 600 a user identifier. For example, the user may request that the subtitle setting be enabled while viewing a media asset having a given characteristic. The media guidance application may identify the user (e.g., using biometric information, facial recognition, or based on a stored user profile). In response to receiving the user request to enable the subtitles setting, the media guidance application may cross-reference database 600 to determine whether the one or more selected characteristics exist in database 600 alone or as a combined entry. For example, if the media guidance application selects a genre and type as the characteristic, the media guidance application may cross-reference database 600 to determine whether an entry for the combination of genre (e.g., comedy) and type (e.g., broadcast program) exists. If an entry in database 600 exists for the selected characteristic(s), the media guidance application may determine whether the entry corresponds to the identity of the user. If the entry corresponds to the identity of the user and the associated subtitles setting is the enabled state, the media guidance application may not update database 600. If the entry corresponds to the identity of the user and the associated subtitles setting is the disabled state, the media guidance application may update the entry for the user in database 600 to be associated with an enabled subtitles setting state. In some implementations, if the entry does not correspond to the identity of the user and the associated subtitles setting is the enabled state, the media guidance application may add a new entry in database 600 that is associated with the identity of the user. The new entry may indicate that for this particular user having the user identification, the subtitles setting should be enabled for media assets having the selected characteristics. If the same user subsequently requests access to a media asset with the same or similar selected characteristics, the media guidance application may automatically enable the subtitles setting, if it is disabled, based on the indication in database 600. However, if a different user subsequently requests access to a media asset with the same or similar selected characteristics, the media guidance application may maintain the state of the subtitles setting (e.g., disabled if it is disabled), based on the indication in database 600.

In some embodiments, the media guidance application may determine that an entry in database 600 does not exist for the selected characteristic(s). In response, the media guidance application may add an entry to database 600 with the selected characteristic(s) and an associated indication that the subtitles setting is in the enabled state.

In some embodiments, database 600 may be shared and updated among multiple users. For example, database 600 may be stored on a remote server. As different users enable/disable subtitles settings of their respective devices, the shared database 600 may be updated to indicate the corresponding enabled/disabled state for the characteristic of the media asset the respective user is accessing. The media guidance application may query database 600 at the remote server to determine whether a corresponding characteristic is associated with an enabled or disabled state of the subtitles setting. The remote server may respond to the media guidance application with the indication of whether the characteristic is associated with the enabled or disabled state of the subtitles setting and the media guidance application may automatically adjust the subtitles setting accordingly.

Subsequent to accessing the first media asset and enabling the subtitles setting, the media guidance application may receive a user request to access a second media asset. For example, the user may request to tune to a channel on which the show "Sports Center" is provided. In response, the media guidance application may present the second media asset (e.g., "Sports Center") to the user. While watching the second media asset, the media guidance application may receive a user request to disable the subtitles setting because the setting was previously enabled. In response to receiving the user request to disable the subtitles setting, the media guidance application may retrieve one or more characteristics associated with the second media asset. For example, the media guidance application may retrieve any information associated with the second media asset as the characteristic (e.g., a category of the first media asset, a genre, a type, a quality indicator such as HD or SD, a title, a content source, a time, and/or any combination thereof). In some implementations, the media guidance application may select a combination of one or more of the multiple characteristics associated with the second media asset for use as the characteristic.

In some embodiments, in response to receiving the user request to disable the subtitles setting, the media guidance application may cross-reference database 600 (FIG. 6) to determine whether the one or more selected characteristics exist in database 600 alone or as a combined entry. For example, if the media guidance application selects a genre and type as the characteristic, the media guidance application may cross-reference database 600 to determine whether an entry for the combination of genre (e.g., comedy) and type (e.g., broadcast program) exists. If an entry in database 600 exists for the selected characteristic(s), the media guidance application may determine whether the associated subtitles setting is an enabled state or a disabled state. In response to determining that the associated subtitles setting is the disabled state, the media guidance application may not update database 600. Alternatively, in response to determining that the associated subtitles setting is the enabled state, the media guidance application may update the entry in database 600 to change the associated subtitles setting to be the disabled state. If the user subsequently requests access to a media asset with the same or similar selected characteristics, the media guidance application may automatically disable the subtitles setting, if it is enabled, based on the indication in database 600.

In some embodiments, the media guidance application may determine that an entry in database 600 does not exist for the selected characteristic(s). In response, the media guidance application may add an entry to database 600 with the selected characteristic(s) and an associated indication that the subtitles setting is in the disabled state.

In some implementations, the one or more characteristics of the media asset that are selected may be based on a user input. For example, the user may set up preferences indicating that only an enumerated set of characteristics should be analyzed to determine whether or not to enabled/disable the subtitles setting. Specifically, the user may indicate that characteristics corresponding to genre and type should be analyzed to determine whether or not to enable/disable the subtitles setting. Accordingly, the media guidance application may only retrieve the characteristics of genre and type of a given media asset for use in cross-referencing database 600 and determining whether or not to automatically enable/disable the subtitles setting.

Subsequent to accessing the first and second media assets and enabling the subtitles setting followed by disabling the subtitles setting, the media guidance application may receive a user request to access a third media asset. For example, the user may request to tune to a channel on which the show "Family Guy" is provided. In response, the media guidance application may present the third media asset (e.g., "Family Guy") to the user. As explained below in connection with FIG. 5, the media guidance application may determine that the third media asset has a characteristic associated with enabling the subtitles setting. Accordingly, the media guidance application may automatically enable the subtitles setting for the third media asset.

FIG. 5 shows an illustrative display screen 500 of a media asset for which a subtitles setting has been automatically enabled in accordance with some embodiments of the disclosure. For example, screen 500 may include media asset 510 (e.g., third media asset "Family Guy") and an overlay 520. Overlay 520 may include characteristics associated with media asset 510 (e.g., genre, title, content source, transmission time, etc.).

In response to receiving the user request to access media asset 510, the media guidance application may retrieve one or more characteristics associated with media asset 510. The choice of which characteristics the media guidance application retrieves may be user-defined or pre-defined by the system. For example, the media guidance application may retrieve the genre characteristic and length characteristic of media asset 510. Specifically, the genre characteristic of media asset 510 may be "comedy" and the length may be "more than 30 minutes". The media guidance application may cross-reference the retrieved characteristics with database 600 to determine whether any entries in database 600 match the retrieved characteristics. Database 600 may determine that the genre "comedy" is associated with enabling the subtitles setting and that the characteristic "more than 30 minutes" is not associated with the subtitles option. In response to receiving the indication from database 600 that at least one of the retrieved characteristics (in this case the "comedy" genre) is associated with enabling the subtitles option, the media guidance application may automatically enable the subtitles setting. In response to receiving the indication from database 600 that none of the retrieved characteristics (in this case the "comedy" genre) is associated with enabling the subtitles option, the media guidance application may maintain the current state of the subtitles setting (e.g., the media guidance application may maintain the subtitles setting in the disabled state). In some embodiments, instead of automatically enabling the subtitles setting, the media guidance application may automatically request user confirmation (e.g., through a displayed interactive prompt) to enable the subtitles setting in response to the indication from database 600. After the user confirms the desire for subtitles by responding to the confirmation, the media guidance application may enable the subtitles setting.

In some embodiments, database 600 may determine that one of the retrieved characteristics is associated with enabling the subtitles setting and another of the retrieved characteristics is associated with disabling the subtitles setting. In such circumstances, the media guidance application may receive this indication and may default to enabling the subtitles setting if any of the characteristics is associated with enabling the subtitles setting. Alternatively, the media guidance application may enable the subtitles setting if a majority of the characteristics is associated with enabling the subtitles setting. Alternatively, the media guidance application may enable the subtitles setting based on priorities assigned to the characteristics. For example, a first characteristic may be assigned a first priority and may be associated with disabling the subtitles setting and a second characteristic may be assigned a second priority that is lower than the first priority and may be associated with enabling the subtitles setting. In such circumstances, the media guidance application may disable the subtitles setting (or maintain the current state of the subtitles setting) because the higher priority characteristic is associated with disabling the subtitles setting.

In some embodiments, after the subtitles option is automatically enabled, the subtitles 530 (or closed-captioning) associated with media asset 510 may be presented together with media asset 510. In some implementations, subtitles 530 may be presented in an overlaying relationship with media asset 510 (overlaying media asset 510). In some implementations, subtitles 530 (when the subtitles setting is enabled) may be presented on a second screen device while media asset 510 continues to be presented on the first device (the primary device).

In some embodiments, when the media guidance application automatically enables the subtitles setting, the media guidance application may display a prompt 540. Prompt 540 may indicate that the subtitles setting has been automatically enabled and the one or more characteristics that are associated with media asset 510 that caused the subtitles setting to be automatically enabled. The media guidance application may provide a disable option 550. In response to receiving a user selection of disable option 550, the media guidance application may prevent enabling the subtitles setting automatically for the selected characteristics. Specifically, in response to receiving a user selection of option 550, the media guidance application may update the entries in database 600 for the retrieved characteristics of media asset 510 to change the associated subtitles setting from being enabled to being disabled.

In some embodiments, the media guidance application may maintain a database 700 of activity types associated with enabling/disabling the subtitles setting. For example, in response to receiving a user request to enable the subtitles setting, the media guidance application may determine an activity type associated with the user. In particular, the media guidance application may receive from monitoring component 316 information about biometrics of the user. The media guidance application may cross-reference database 700 (FIG. 7) to determine whether the activity type exists in database 700. For example, if the media guidance application receives biometrics of the user, the media guidance application may cross-reference database 700 to determine whether an entry for the received biometrics exists. If an entry in database 700 exists for the activity type, the media guidance application may determine whether the associated subtitles setting is an enabled state or a disabled state. In response to determining that the associated subtitles setting is the enabled state, the media guidance application may not update database 700. Alternatively, in response to determining that the associated subtitles setting is the disabled state, the media guidance application may update the entry in database 700 to change the associated subtitles setting to be the enabled state. If the user subsequently requests access to a media asset and the media guidance application determines the existence of the same or similar activity type (e.g., the same or similar biometrics), the media guidance application may automatically enable the subtitles setting, if it is disabled, based on the indication in database 700.

In some embodiments, the media guidance application may only update a subtitle setting state in database 700 after receiving a threshold number of similar inconsistent requests. For example, the user may request that the subtitle setting be enabled during existence of a given activity type. If the characteristic is associated in database 700 with a disabled state, the media guidance application may determine for that same activity type how many times the user previously requested that the subtitles setting be enabled. If the user previously requested that the subtitles setting for the activity type be enabled more than a threshold number of times (e.g., more than 5 times), and the associated subtitles setting is the disabled state, the media guidance application may update the entry in database 700 to change the associated subtitles setting to be the enabled state. If the user previously requested that the subtitles setting for the activity type be enabled less than a threshold number of times (e.g., less than 5 times), and the associated subtitles setting is the disabled state, the media guidance application may maintain the state of the entry in database 700 as disabled state.

In some embodiments, the media guidance application may update a subtitle setting state in database 700 to correspond to a majority of subtitles setting requests. For example, one user may request that the subtitles setting be enabled when a given activity type exists whereas another user may request that the subtitles setting be disabled when the same given activity type exists. If the activity type is associated in database 700 with a disabled state, the media guidance application may determine a majority of previous user requests (e.g., over a given period of time (days) associated with enabling or disabling the subtitles setting. If the majority previous user requests for the activity type were to enable the subtitles setting, and the associated subtitles setting is the disabled state, the media guidance application may update the entry in database 700 to change the associated subtitles setting to be the enabled state. If the majority previous user requests for the activity type were to disable the subtitles setting, and the associated subtitles setting is the disabled state, the media guidance application may maintain the state of the entry in database 700 as disabled state.

In some embodiments, the media guidance application may include with a subtitle setting state in database 700 a user identifier. For example, the user may request that the subtitle setting be enabled when a given activity type exists. The media guidance application may identify the user (e.g., using biometric information, facial recognition, or based on a stored user profile). In response to receiving the user request to enable the subtitles setting, the media guidance application may cross-reference database 700 to determine whether the activity type exists in database 700 alone or as a combined entry. For example, if the media guidance application selects running as the activity type, the media guidance application may cross-reference database 700 to determine whether an entry for the running exists. If an entry in database 700 exists for the selected characteristic(s), the media guidance application may determine whether the entry corresponds to the identity of the user. If the entry corresponds to the identity of the user and the associated subtitles setting is the enabled state, the media guidance application may not update database 700. If the entry corresponds to the identity of the user and the associated subtitles setting is the disabled state, the media guidance application may update the entry for the user in database 700 to be associated with an enabled subtitles setting state. In some implementations, if the entry does not correspond to the identity of the user and the associated subtitles setting is the enabled state, the media guidance application may add a new entry in database 700 that is associated with the identity of the user. The new entry may indicate that for this particular user having the user identification, the subtitles setting should be enabled for the given activity type. If the same user subsequently requests access when the activity type exists (e.g., while running), the media guidance application may automatically enable the subtitles setting, if it is disabled, based on the indication in database 700. However, if a different user subsequently requests access to a media asset when the activity type exists (e.g., while running), the media guidance application may maintain the state of the subtitles setting (e.g., disabled if it is disabled), based on the indication in database 600.

In some embodiments, the media guidance application may determine that an entry in database 700 does not exist for the activity type. In response, the media guidance application may add an entry to database 700 with the activity type (e.g., the received biometric information for the user) and an associated indication that the subtitles setting is in the enabled state.

For example, the media guidance application may receive a user request to enable subtitles while the user is running. The media guidance application may select running as the activity type and store an indication (if one does not already exist) in database 700 for the running activity indicating that the subtitles setting is in the enabled state. When the user runs in the future (e.g., on another day) and requests access to a media asset, the media guidance application may determine that the activity type is running and is associated with a subtitles setting that is in the enabled state. Accordingly, the media guidance application may automatically enable the subtitles setting. In some implementations, the media guidance application may maintain the subtitles setting in the enabled/disabled state that was automatically selected until the activity type is no longer detected. For example, as soon as the user stops running, the media guidance application may determine that the activity type does not exist and may therefore disable the subtitles setting.

In some embodiments, the media guidance application may enable the subtitles setting if the current activity type matches an activity type that is associated with a state of the subtitles setting that is enabled and if the characteristic of the media asset being accessed is also associated with a state of the subtitles setting that is enabled. For example, in response to receiving a user request to access a media asset, the media guidance application may retrieve characteristics of the media asset. The media guidance application may cross-reference the retrieved characteristics with database 600 (FIG. 6) to determine whether or not the associated subtitles setting is in the enabled or disabled state. In response to determining that the characteristics are associated with the enabled state, the media guidance application may determine an activity type associated with the user. The media guidance application may cross-reference the retrieved activity type with database 700 (FIG. 7) to determine whether or not the associated subtitles setting is in the enabled or disabled state. In response to determining that the characteristics are associated with the enabled state and the activity type is associated with the enabled state of the subtitles setting, the media guidance application may automatically enable the subtitles setting.

In some implementations, if either the characteristics of the media asset or the activity type is associated with the enabled state of the subtitles setting, the media guidance application may automatically enable the subtitles setting. In some implementations, if the characteristics of the media asset are associated with the disabled state but the activity type is associated with the enabled state of the subtitles setting, the media guidance application may automatically enable the subtitles setting. In some implementations, if the characteristics of the media asset are associated with the enabled state but the activity type is associated with the disabled state of the subtitles setting, the media guidance application may automatically enable the subtitles setting.

In some embodiments, database 700 may be shared and updated among multiple users. For example, database 700 may be stored on a remote server. As different users enable/ disable subtitles settings of their respective devices, the shared database 700 may be updated to indicate the corresponding enabled/disabled state for the activity types of the respective users. The media guidance application may query database 700 at the remote server to determine whether a corresponding activity type is associated with an enabled or disabled state of the subtitles setting. The remote server may respond to the media guidance application with the indication of whether the characteristic is associated with the enabled or disabled state of the subtitles setting and the media guidance application may automatically adjust the subtitles setting accordingly.

Figure 8A:
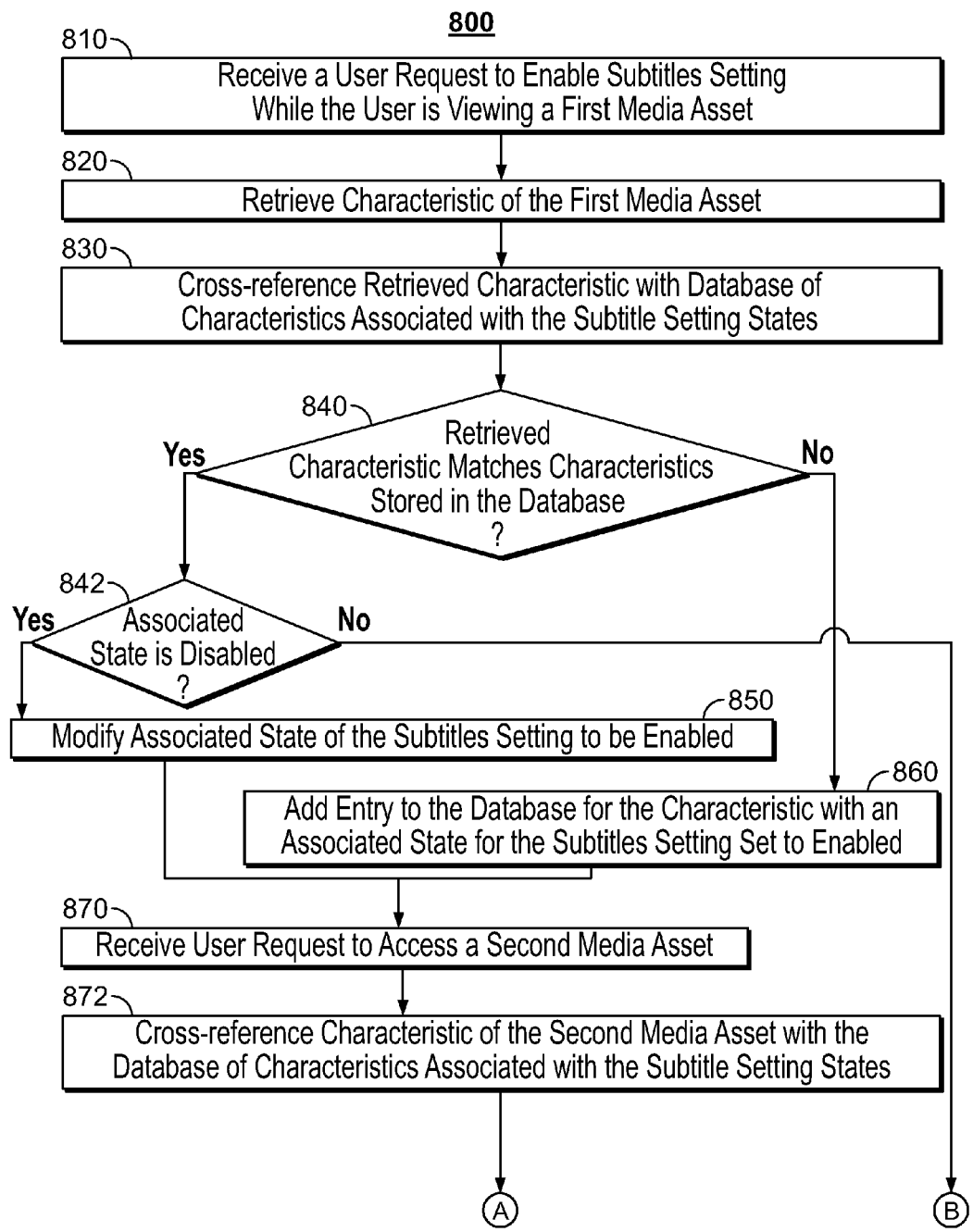
FIGS. 8A and 8B are diagrams of a process for automatically updating user preferences for subtitles in accordance with some embodiments of the disclosure.
Figure 8B:
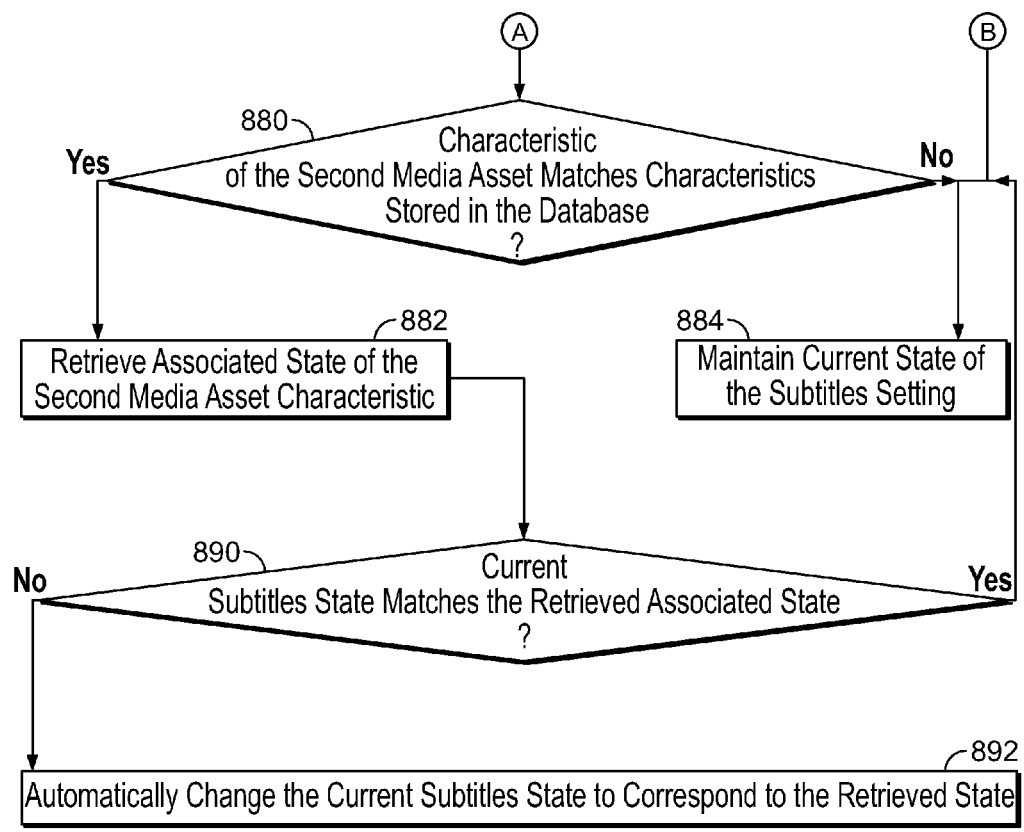

FIGS. 8A and 8B are diagrams of a process 800 for automatically updating user preferences for subtitles in accordance with some embodiments of the disclosure. At step 810, a user request to enable subtitles is received while the user is viewing a first media asset. For example, the media guidance application may present a first media asset (e.g., Seinfeld) and the user may press a SUBTITLES key or select a subtitles on-screen option to enable the subtitles setting.

At step 820, a characteristic of the first media asset may be retrieved. For example, the media guidance application may access media guidance data associated with the first media asset to retrieve information associated with the first media asset (e.g., title, length, description, genre, category, type, etc.). The media guidance application may select one or more of the information associated with the first media asset as the characteristic.

At step 830, the retrieved one or more characteristics may be cross-referenced with a database of characteristics associated with the subtitles setting states. For example, the media guidance application may cross-reference the one or more characteristics with database 600 (FIG. 6) to determine whether a characteristic exists that matches the selected one or more characteristics.

At step 840, a determination is made as to whether the retrieved characteristic matches characteristics stored in the database. In response to determining that the characteristic matches characteristics in the database, the process proceeds to step 842; otherwise, the process proceeds to step 860.

At step 842, a determination is made as to whether the associated subtitles state is disabled. In response to determining that the associated subtitles state is disabled, the process proceeds to step 850, otherwise the process proceeds to step 884. For example, the media guidance application may determine whether the state of the subtitles setting that is associated with the characteristic in database 600 determined to match is enabled or disabled.

At step 850, the associated state of the subtitles setting is modified to be enabled. For example, the media guidance application may modify the state of the subtitles setting that is associated with the characteristic in database 600 to be enabled from being disabled.

At step 860, an entry is added to the database for the characteristic associated with the state for the subtitles setting set to enabled. For example, the media guidance application may instruct database 600 to add an entry having the retrieved characteristic of the first media asset being associated with an enabled subtitles setting state (e.g., a new entry with a first field matching the retrieved characteristic and second field being an indication of an enabled state of the subtitles setting).

At step 870, a user request to access a second media asset is received. For example, the media guidance application may receive a user request to tune to a channel on which the second media asset (e.g., "Family Guy") is provided.

At step 872, one or more characteristics associated with the second media asset may be cross-referenced with the database of characteristics associated with the subtitles setting states. For example, the media guidance application may cross-reference one or more characteristics (e.g., a selected subset of information) of the second media asset with database 600 (FIG. 6) to determine whether a characteristic exists that matches the selected one or more characteristics.

At step 880, a determination is made as to whether the retrieved characteristic of the second media asset matches characteristics stored in the database. In response to determining that the characteristic matches characteristics in the database, the process proceeds to step 882; otherwise, the process proceeds to step 884.

At step 882, the associated state of the subtitles setting for the second media asset characteristic is retrieved. For example, the media guidance application may retrieve the state of the subtitles setting from the subtitles settings state field of database 600 that corresponds to the characteristics field that matches the characteristics of the second media asset.

At step 884, the current state of the subtitles setting is maintained. For example, the media guidance application may not change the subtitles setting of user equipment device 300. Accordingly, if the subtitles setting was last set to the enabled state, subtitles may continue to be presented (if available) for any media asset that is accessed. Similarly, if the subtitles setting was last set to the disabled state, subtitles may not be presented for any media asset that is accessed.

At step 890, a determination is made as to whether the current subtitles setting state matches the retrieved associated subtitles setting state. In response to determining that the current subtitles setting state matches the retrieved associated subtitles setting state, the process proceeds to step 884; otherwise, the process proceeds to step 892. For example, the media guidance application may compare the current state of the subtitles setting (e.g., the state of the subtitles setting of user equipment device 300 that was last set) to the state retrieved from database 600 to determine whether they match.

At step 892, the current subtitles setting state is automatically changed to correspond to the state retrieved from database 600. For example, if database 600 returns to the media guidance application the value of the subtitles setting state field indicating the state to be enabled, the media guidance application may automatically modify the current subtitles state from disabled to enabled. Alternatively, if database 600 returns to the media guidance application the value of the subtitles setting state field indicating the state to be disabled, the media guidance application may automatically modify the current subtitles state from enabled to disabled.

Figure 9:
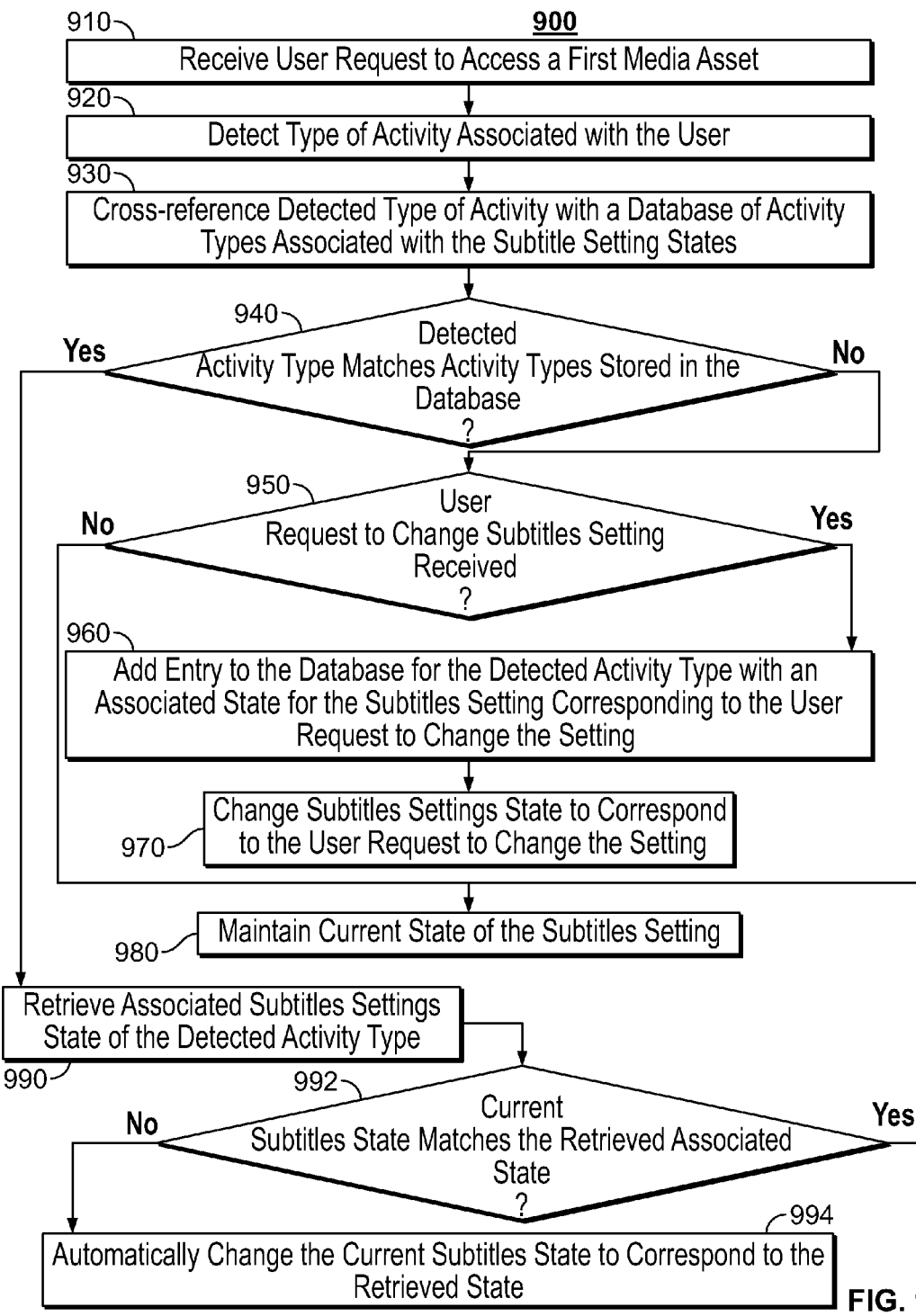
FIG. 9 is a diagram of a process for automatically enabling a subtitles setting based on activity types in accordance with some embodiments of the disclosure.

FIG. 9 is a diagram of a process 900 for automatically enabling a subtitles setting based on activity types in accordance with some embodiments of the disclosure. At step 910, a user request to access a first media asset is received. For example, the media guidance application may receive a user request to access a channel that provides the media asset "Seinfeld".

At step 920, a type of activity associated with the user is detected. For example, the media guidance application may receive biometric information associated with the user from monitoring component 316 (FIG. 3). Alternatively, or in addition, the media guidance application may use monitoring component 316 to detect one or more gestures or brainwave information associated with the user. The media guidance application may in some implementations detect a physical activity as the type of activity (e.g., that the user is running).

At step 930, the detected type of activity may be cross-referenced with a database of activity types associated with a subtitles setting state. For example, the media guidance application may cross-reference the activity type with database 700 (FIG. 7 to determine whether an activity type exists that matches the detected activity type.

At step 940, a determination is made as to whether the detected activity type matches activity types stored in the database. In response to determining that the detected activity type matches, the process proceeds to step 990; otherwise, the process proceeds to step 950.

At step 990, the associated subtitles setting state of the detected activity type is retrieved. For example, the media guidance application may retrieve the state of the subtitles setting from the subtitles setting state field of database 700 that corresponds to the activity type field that matches the detected activity type associated with the user.

At step 950, a determination is made as to whether a user request to change the subtitles setting was received. In response to determining that the user request to change the subtitles setting was received, the process proceeds to step 960; otherwise, the process proceeds to step 980.

At step 960, a new entry is added to the database for the detected activity type with an associated state for the subtitles setting corresponding to the user request to change the setting. For example, the media guidance application may instruct database 700 to add an entry having the detected activity type being associated with a subtitles setting state corresponding to that requested by the user (e.g., a new entry with a first field matching the detected activity type and second field being an indication of an enabled or disabled state of the subtitles setting). If the user last requested to enable the subtitles setting, the media guidance application may instruct database 700 to add an entry having the detected activity type being associated with a subtitles setting state set to the enabled state. If the user last requested to disable the subtitles setting, the media guidance application may instruct database 700 to add an entry having the detected activity type being associated with a subtitles setting state set to the disabled state.

At step 970, the subtitles settings state is changed to correspond to the user request to change the subtitles setting state. For example, if the media guidance application received a user request to enable the subtitles setting, the media guidance application may change the subtitles settings from the disabled state to the enabled state.

At step 980, the current state of the subtitles setting is maintained. For example, the media guidance application may not change the subtitles setting of user equipment device 300. Accordingly, if the subtitles setting was last set to the enabled state, subtitles may continue to be presented (if available) for any media asset that is accessed. Similarly, if the subtitles setting was last set to the disabled state, subtitles may not be presented for any media asset that is accessed.

At step 992, a determination is made as to whether the current subtitles setting state matches the retrieved associated subtitles setting state. In response to determining that the current subtitles setting state matches the retrieved associated subtitles setting state, the process proceeds to step 980; otherwise, the process proceeds to step 994. For example, the media guidance application may compare the current state of the subtitles setting (e.g., the state of the subtitles setting of user equipment device 300 that was last set) to the state retrieved from database 700 to determine whether they match.

At step 994, the current subtitles setting state is automatically changed to correspond to the state retrieved from database 700. For example, if database 700 returns to the media guidance application the value of the subtitles setting state field indicating the state to be enabled, the media guidance application may automatically modify the current subtitles state from disabled to enabled. Alternatively, if database 700 returns to the media guidance application the value of the subtitles setting state field indicating the state to be disabled, the media guidance application may automatically modify the current subtitles state from enabled to disabled.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for automatically enabling subtitles, the method comprising:
   receiving a user request to enable subtitles setting while the user is viewing a first media asset;
   retrieving a subject matter associated with the first media asset;
   determining whether a subtitles setting state associated with the retrieved subject matter is set to a disabled state when the user request to enable subtitles setting for the first media asset is received;
   in response to determining the subtitles setting state associated with the retrieved subject matter is set to the disabled state, incrementing a number representing how many user requests to enable the subtitles setting state were previously received at a time the subtitles setting state was set to the disabled state;
   in response to determining the number exceeds a threshold, automatically updating the subtitles setting state associated with the retrieved subject matter to an enabled state; and
   automatically enabling the subtitles setting when the subtitles setting is disabled, based on the subtitles setting state, when a second media asset that is associated with the retrieved subject matter is accessed.

2. The method of claim 1, wherein the updating comprises automatically storing information in a profile associated with the user indicating that the user prefers subtitles for media assets associated with the retrieved subject matter.

3. The method of claim 1 further comprising:
   causing the third media asset to be displayed with subtitles after receiving the user request to enable the subtitles setting;
   receiving a user request to disable the subtitles setting when the third media asset is accessed; and
   updating a user profile to indicate that the user does not prefer subtitles of media assets associated with a subject matter of the third media asset.

4. The method of claim 1, further comprising:
receiving a user request to disable the subtitles setting during presentation of a third media asset;
receiving a user request to access the second media asset after the third media asset is presented;
determining that the subtitles setting is disabled when the second media asset is accessed; and
automatically causing the second media asset to be presented together with subtitles based on the subtitles setting state.

5. The method of claim 1, wherein the subject matter includes at least one of a genre, and a category.

6. The method of claim 1 further comprising automatically disabling the subtitles setting during presentation of media assets that are not associated with the retrieved subject matter.

7. The method of claim 1, wherein the subtitles are transmitted together with the first media asset.

8. The method of claim 1, wherein first media asset is presented to the user on a first user equipment device, and wherein the subtitles setting is enabled for presenting subtitles to the user on a second user equipment device.

9. The method of claim 1 further comprising:
receiving a user request to access a third media asset after the subtitles setting has been enabled for the first media asset;
determining that the third media asset is associated with a subject matter of a fourth media asset, wherein during a previous presentation of the fourth media asset the user requested that the subtitles setting be disabled; and
automatically disabling the subtitles setting for the third media asset based on the determining.

10. The method of claim 1 further comprising in response to receiving the user request maintaining a display of subtitles for media assets accessed after the first media asset.

11. A system for automatically enabling subtitles, the system comprising:
user input device;
storage device; and
control circuitry configured to:
receive, from the user input device, a user request to enable subtitles setting while the user is viewing a first media asset;
retrieve, from the storage device, a subject matter associated with the first media asset;
determine whether a subtitles setting state associated with the retrieved subject matter is set to a disabled state when the user request to enable subtitles setting for the first media asset is received;
in response to determining the subtitles setting state associated with the retrieved subject matter is set to the disabled state, increment a number representing how many user requests to enable the subtitles setting state were previously received at a time the subtitles setting state was set to the disabled state;
in response to determining the number exceeds a threshold, automatically updating the subtitles setting state associated with the retrieved subject matter to an enabled state; and
automatically enable the subtitles setting when the subtitles setting is disabled, based on the subtitles setting state, when a second media asset that is associated with the retrieved subject matter is accessed.

12. The system of claim 11, wherein the control circuitry is further configured to automatically store information in a profile associated with the user indicating that the user prefers subtitles for media assets associated with the retrieved subject matter.

13. The system of claim 11, wherein the control circuitry is further configured to:
cause the third media asset to be displayed with subtitles after receiving the user request to enable the subtitles setting;
receive a user request to disable the subtitles setting when the third media asset is accessed; and
update a user profile to indicate that the user does not prefer subtitles of media assets associated with a subject matter of the third media asset.

14. The system of claim 11, wherein the control circuitry is further configured to:
receive a user request to disable the subtitles setting during presentation of a third media asset;
receive a user request to access the second media asset after the third media asset is presented;
determine that the subtitles setting is disabled when the second media asset is accessed; and
automatically cause the second media asset to be presented together with subtitles based on the subtitles setting state.

15. The system of claim 11, wherein the subject matter includes at least one of a genre, and a category.

16. The system of claim 11, wherein the control circuitry is further configured to automatically disable the subtitles setting during presentation of media assets that are not associated with the retrieved subject matter.

17. The system of claim 11, wherein the subtitles are transmitted together with the first media asset.

18. The system of claim 11, wherein first media asset is presented to the user on a first user equipment device, and wherein the subtitles setting is enabled for presenting subtitles to the user on a second user equipment device.

19. The system of claim 11, wherein the control circuitry is further configured to:
receive a user request to access a third media asset after the subtitles setting has been enabled for the first media asset;
determine that the third media asset is associated with a subject matter of a fourth media asset, wherein during a previous presentation of the fourth media asset the user requested that the subtitles setting be disabled; and
automatically disable the subtitles setting for the third media asset based on the determining.

20. The system of claim 11, wherein the control circuitry is further configured to, in response to receiving the user request, maintain a display of subtitles for media assets accessed after the first media asset.

* * * * *